United States Patent [19]

Hamza et al.

[11] Patent Number: 5,347,664
[45] Date of Patent: Sep. 20, 1994

[54] SUCTION FITTING WITH PUMP CONTROL DEVICE

[75] Inventors: Hassan Hamza; Garrett J. Burkitt, III, both of Simi Valley; Gordon D. Olson, Rancho Palos Verdes, all of Calif.

[73] Assignee: KDI American Products, Inc., Moorpark, Calif.

[21] Appl. No.: 791,918

[22] Filed: Nov. 12, 1991

Related U.S. Application Data

[63] Continuation-in-part of Ser. No. 541,138, Jun. 20, 1990, abandoned.

[51] Int. Cl.$^5$ .............................................. E04H 4/12
[52] U.S. Cl. ................................... 4/509; 4/541.2; 4/292; 210/416.2
[58] Field of Search .................. 4/288, 289, 292, 504, 4/507, 509, 541.1, 541.2, 541.3, 541.4, 668, 669; 210/163, 166, 169, 248, 416.2, 459, 461, 463; 417/40, 43, 44; 137/399, 563, 565

[56] References Cited

U.S. PATENT DOCUMENTS

| | | | |
|---|---|---|---|
| 2,052,565 | 9/1936 | Groeniger | 4/292 X |
| 3,759,286 | 9/1973 | Page | 4/508 X |
| 4,115,878 | 9/1978 | Johnson et al. | 4/509 X |
| 4,460,462 | 7/1984 | Arneson | 210/169 X |
| 4,596,656 | 6/1986 | Higginbotham et al. | 210/169 X |
| 4,602,391 | 7/1986 | Shepherd | 4/504 X |
| 4,620,835 | 11/1986 | Bell | 4/504 X |
| 4,676,894 | 6/1987 | Diamond et al. | 4/541.3 X |
| 4,742,456 | 5/1988 | Kamena | 4/541.2 X |

FOREIGN PATENT DOCUMENTS

| | | | |
|---|---|---|---|
| 2132904 | 1/1973 | Fed. Rep. of Germany | 4/507 |
| 3507472 | 9/1986 | Fed. Rep. of Germany | 4/541.1 |
| 4010862 | 4/1991 | Fed. Rep. of Germany | 4/507 |
| 0012946 | 1/1983 | Japan | 4/541.1 |
| 8601100 | 2/1986 | World Int. Prop. O. | 4/541.4 |

*Primary Examiner*—Robert M. Fetsuga
*Attorney, Agent, or Firm*—Noel F. Heal; Lois Babcock

[57] ABSTRACT

A suction fitting for use in a water circulation system, the fitting having a perforated body that is mounted to permit fluid flow through both front and rear perforated faces, and thereby minimize the possibility of complete blockage of the fitting by entrapped hair or skin. Operation of a circulating pump is controlled to prevent damage to equipment and property and also to minimize the possibility of serious personal injury or death. The suction fitting further includes a suction tube for connection to the pump, for circulating water in the tub or spa back through jets in the tub or spa, and a pressure sensor line connecting the water in the tub or spa to a water level sensor. The front face of the perforated body has a number of grooves, to provide fluid communication between the pressure sensor line and the suction tube, through one or more front-face perforations. When flow into the suction fitting is blocked, a reduced pressure is sensed immediately behind the front face of the perforated body, through the pressure sensor line and the grooves in the front face, and the pump is disabled to prevent damage or physical injury.

10 Claims, 4 Drawing Sheets

SUCTION FITTING WITH PUMP CONTROL DEVICE

CROSS-REFERENCE TO RELATED APPLICATION

This is a continuation-in-part of application Ser. No. 07/541,138, filed Jun. 20, 1990, by Garrett J. Burkitt III, having the same title this invention, and now abandoned.

BACKGROUND OF THE INVENTION

This invention relates generally to suction fittings for use with water-circulating pumps in spas and tubs. More particularly, the invention relates to suction fittings having safety features that minimize problems of personal injury and damage to equipment.

Hot tubs and spas are generally equipped with pumps for the circulation of water. Although these circulating pumps may be run indefinitely, most use a timer for safety reasons, and some use a level sensor to preclude their operation when the water level is low. Without the use of automatic shutoff devices, a circulating pump may be damaged by continuous operation. For example, a condition such as low water level could cause the pump to burn out or cause water jets to spray out of the tub area. A related difficulty is that a person entering or leaving the tub or spa causes undesirable changes in the water level. Too high a level may result in overflow of the tub. Too low a level may uncover the water jets. The use of a timer to control operation of the pump does not adequately address these problems.

Some tubs or spas use a level sensor to control the operation of the pump. A hole is required to be drilled in the wall of these tubs or spas and a fitting installed for connection to the sensor by means of a hose. Use of a fitting of this general type increases the chance of leaks, since an additional hole is needed for installation. Another drawback of level sensors is that they become inoperative if the hose becomes dislodged from the fitting.

An even more important problem with suction fittings arises when the fitting itself becomes blocked. Foreign objects, such as hair, skin or some other part of a person positioned near or leaning against the fitting can cause a permanent or temporary blockage, during which the pump will operate unsafely. Blocking the suction fitting with hair or the body can cause serious personal injury or death. Although suction fittings are designed to operate safely within a rated flow range, if that flow range is exceeded entrapment of the hair or part of the body can occur. Using a timer or level sensor will not alleviate this problem.

The invention described and claimed in the cross-referenced application overcomes many of the drawbacks discussed above, and operates satisfactorily in most situations. The present invention is concerned with further improvements in suction fittings of the same general type.

SUMMARY OF THE INVENTION

The present invention resides in an improved suction fitting for use with a circulating pump, and a sensor that deactivates operation of the pump during unsafe conditions. Briefly and in general terms, the invention includes a fluid suction fitting comprising a hollow body, having perforated front and rear faces, for installation below fluid level in a tub or spa; a suction tube in fluid communication with the body, for coupling the body, through a wall of the tub or spa, to a circulating pump line; and means for mounting the perforated body such that it is held away from the wall, to permit water to flow through perforations in the rear face. The chance of complete blockage of the fitting is minimized by the presence of perforations in the rear face. Even when the front face becomes completely blocked, as by a mat of hair or when a person leans against the fitting, the rear face will still probably be clear of blockage, and the possibility of entrapment or physical damage is greatly reduced.

More specifically, the hollow body is generally disk-shaped and has a circumferential wall connecting its front and rear faces. In accordance with another aspect of the invention, the hollow body includes additional perforations in the circumferential wall, to further reduce the chance of complete blockage. The tube in the presently preferred embodiment is integral with the rear face of the hollow body, and the means for mounting the perforated body includes a raised area integral with the rear face of the hollow body. The raised area is secured against the wall of the tub or spa, and at least a portion of the rear face is thereby spaced from the wall.

In accordance with another aspect of the invention, the tube connects with the rear face close to an edge of the face, to facilitate mounting of the suction fitting immediately adjacent to a bottom surface of the tub or spa. Thus the suction fitting can be installed deeper in the tub or spa and is less susceptible to damage.

The suction fitting of the invention is preferably used in conjunction with means for controlling operation of the pump in response to a condition in which fluid flow through the suction fitting to the pump is impeded. In this context, the invention further comprises pressure sensing means integral with the suction fitting, for sensing fluid pressure in the tub or spa during normal operation and for sensing reduced pressure immediately downstream of a blockage in the suction fitting. The means for controlling operation of the pump in response to a condition in which fluid flow through the suction fitting is impeded, as detected by the pressure sensing means, includes means for shutting off the pump in the event of a detected blockage, whereby the possibility of damage or serious personal injury is further minimized. The pressure sensing means includes a sensor tube extending through the suction fitting and having an opening into the tub or spa, and fluid communication means extending from the opening of the sensor tube to a region immediately downstream of the suction fitting, to permit the pressure sensing means to detect a reduced pressure immediately downstream of the blockage.

More specifically, the fluid communication means includes one or more recessed channels on the front face of the suction fitting, connecting the sensor tube to at least some of the perforations in the front face. When the front face is substantially blocked, the recessed channels may still provide a fluid path between the sensor tube and a region immediately downstream of the front face, and thereby permit sensing of pressure in this region.

In the disclosed embodiment of the suction fitting, the suction tube includes a threaded portion integral with the rear face of the fitting, and the integral means for supporting the perforated body held away from the tub or spa wall includes a raised area surrounding the threaded portion of the suction tube. The threaded portion is secured through the wall of the tub or spa, with the raised portion of the rear face engaging the wall to hold the perforated body of the suction fitting out from the wall. Preferably, the suction tube is offset toward one edge of the perforated body, to facilitate installation of the suction fitting close to a bottom wall of the tub or spa.

It will be appreciated from the foregoing that the present invention represents a significant advance in the field of suction fittings for use with circulating pumps for tubs or spas as used in combination with pump control devices. In particular the invention provides a suction fitting that is mounted to present perforate openings in its front face, its rear face, and optionally in an edge wall, to reduce the probability of complete blockage of the fitting. As in the invention described and claimed in the cross-referenced application, the present invention further includes means for detecting blockage of the suction fitting as well as detecting high or low water levels in the tub or spa, and means for controlling the pump in response to these conditions, to prevent unsafe operation of the pump and to minimize the possibility of serious personal injury or death. Other aspects and advantages of the invention will become apparent from the following more detailed description, taken in conjunction with the accompanying drawings.

DESCRIPTION OF THE PREFERRED EMBODIMENT

Figure 1:
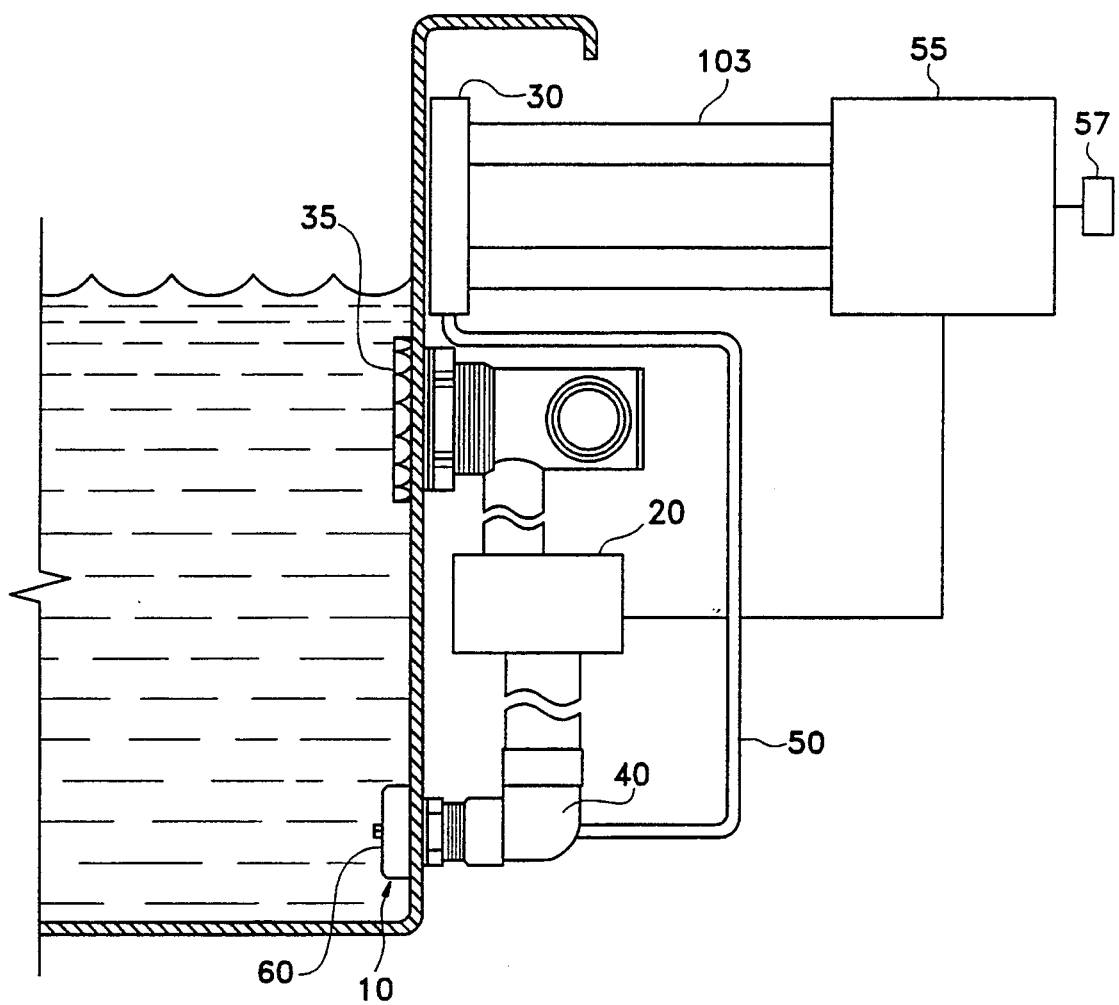
FIG. 1 is a diagrammatic view of a fluid circulation apparatus in which the present invention is installed.

As shown in the drawings for purposes of illustration, the present invention is concerned with improvements in the field of suction fittings for use with water circulating pumps, particularly for spas and tubs. A suction fitting provides a fluid communication passage between water in the tub or spa and a suction line leading to a circulating pump. In the past, such pumps were either run indefinitely, or were regulated by timers or independent level sensors. In either case, a pump might be operated during unsafe conditions and damage could result.

Use of an independent level sensor increases the likelihood of leaks, because an additional opening must be made in the wall of the tub or spa for installation of the sensor. Another drawback is that a connecting tube used with the level sensor could become dislodged, and the sensor would then become inoperative.

Generally, prior techniques for controlling operation of the pump do not take into consideration the possibility that the suction fitting itself might become blocked, with resulting equipment damage and possible serious personal injury, or even death. The suction fitting can become blocked with foreign objects, such as hair or skin, or can become blocked by someone leaning against the fitting.

The present invention is used in fluid circulation apparatus for a tub or spa, and includes a suction fitting 10 for installation beneath water level in the tub or spa, a pump 20 for circulating the water back to the tub or spa, and a water level sensor 30 for sensing the pressure in the suction fitting and deactivating the pump if the pressure within the suction fitting falls below a preselected level. The pump 20 is connected to the suction fitting 10 and to spa jets installed in the tub wall, one such jet being shown at 35. The pump 20 draws water from the tub through the suction fitting 10, and discharges the water back into the tub through the spa jets 35.

Figure 3:
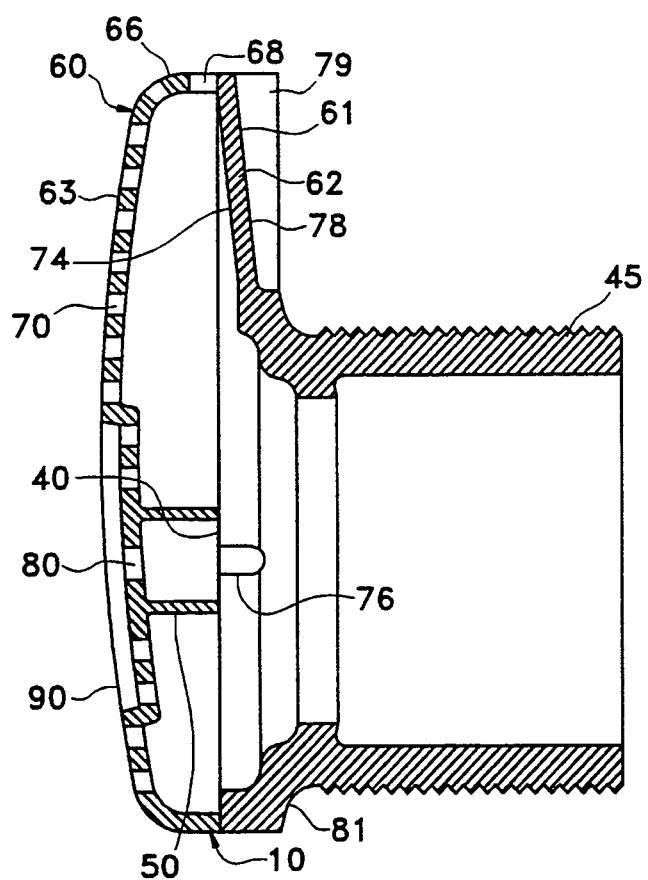
FIG. 3 is a sectional view of the suction fitting of the invention, taken generally along the line 3—3 of FIG. 2.
Figure 5:
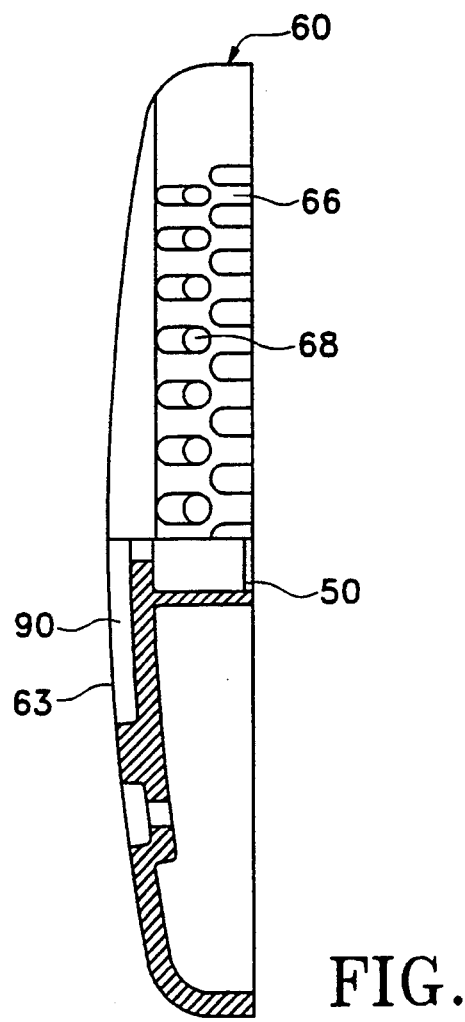
FIG. 5 is a fragmentary elevational view, partly in section, of the suction fitting of FIG. 2, showing additional perforations in the edge of the fitting.

The circulation apparatus includes the suction fitting 10, a suction fluid line 40 for connecting the water in the tub or spa to the circulation pump 20, a pressure sensor line 50 for connecting the water in the tub or spa with the water level sensor 30, and a protective covering 60 to prevent foreign objects, such as hair or skin, from entering the suction fitting. FIG. 3 and FIG. 5 show these components in more detail.

Figure 4:
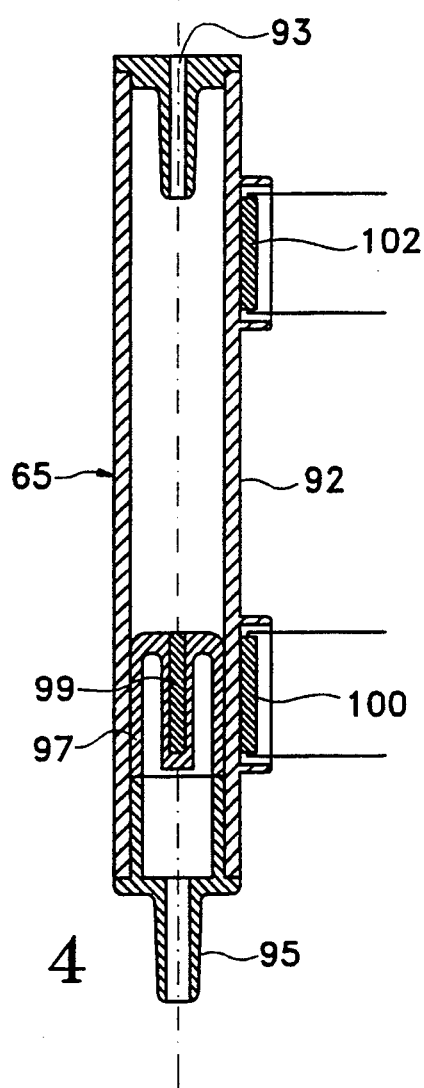
FIG. 4 is an enlarged sectional elevational view of a float assembly used for level sensing in the invention as shown in FIG. 1.

In the preferred embodiment of the invention, a portion of the pressure sensor line 50 is an integral part of the suction fitting 10, eliminating the need for an additional opening in the tub or spa wall, for level sensing or for an additional fluid line with a column of fluid to be used for preventing cavitation of the pump. Also in the preferred embodiment, the water level sensor 30 is a float assembly 65, as shown in FIG. 4, located on the outside and preferably under an exterior lip of the tub or spa. This location allows the float assembly 65 to deactivate the pump 20 and activate an alarm 57 (FIG. 1), if the fluid level reaches a potential overflow condition that could cause damage to equipment or surrounding property. As shown in FIG. 4, the float assembly 65 includes a float chamber 92 having a vent hole 93 at its upper end and an integral nipple 95 at its lower end for connection to the sensor line 50. A float 97 moves up and down in the chamber 92 as the water level rises and falls. The float 97 carries a permanent magnet 99, and can operate either of two magnetic switches 100,102 mounted outside the float chamber 92. The switches 100,102 are positioned to define a prescribed safe region for the sensed water level. Therefore, movement out of a prescribed safe region causes the activation of one of the magnetic switches 100,102, each of which is connected by lines 103 to a control box 55 (FIG. 1), which effects deactivation of the pump 20 or activation of an alarm 57 when an adverse condition exists, such as the fluid level in the tub or spa being too high or too low, or when the suction fitting is blocked. As will be further discussed, blockage of the suction fitting will cause the float 97 to move to a lower position.

Figure 2:
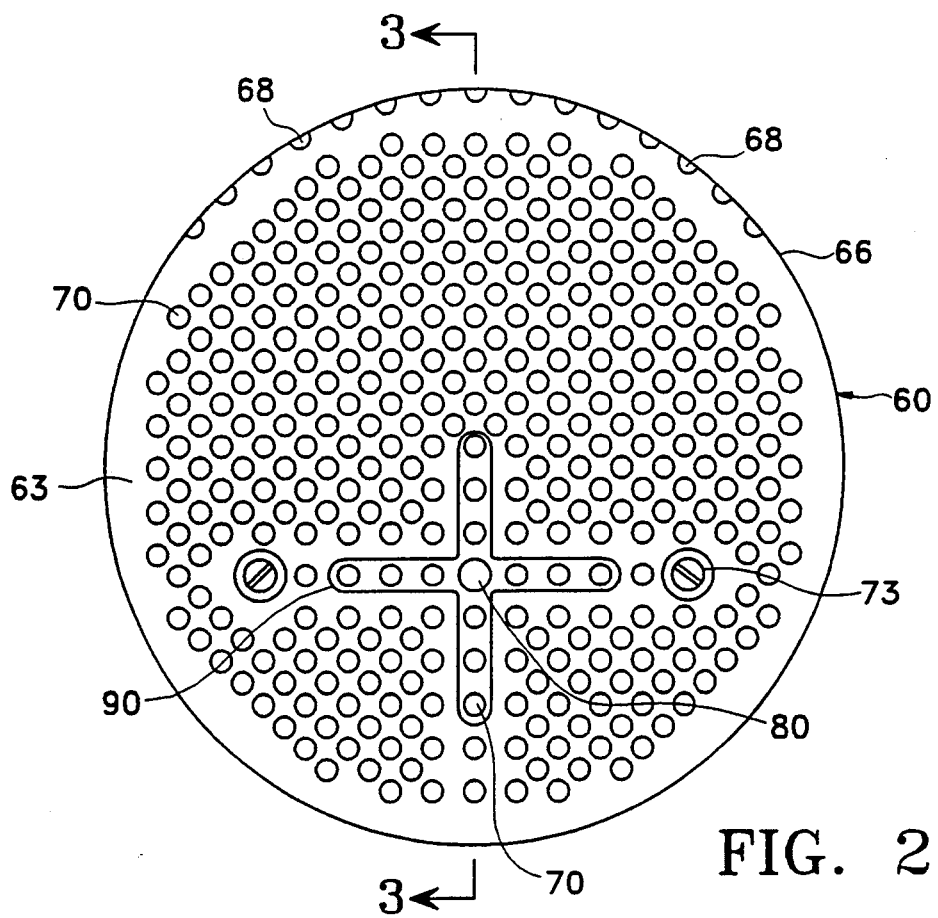
FIG. 2 is an enlarged front view of the suction fitting shown in FIG. 1, showing a front face of the fitting.

The protective covering 60 for the suction fitting 10, as best shown in FIG. 2 and FIG. 5, is generally disk-shaped. It may also be described as a hollow perforated flange 62 having a perforated front face 63 and a perforated rear face 61, as well as perforations 68 through a portion of its circumferential edge surface 66, as shown in FIGS. 3 and 5. In the illustrative embodiment of the invention, the front face 63 and the adjoining edge surface 66 are formed as a single component, sized to engage the circumference of the rear face 61, to be held in place by a pair of screws 73, which extend through the front face and engage threaded extensions 76 (FIGS. 3 and 6) formed on the rear face.

Figure 6:
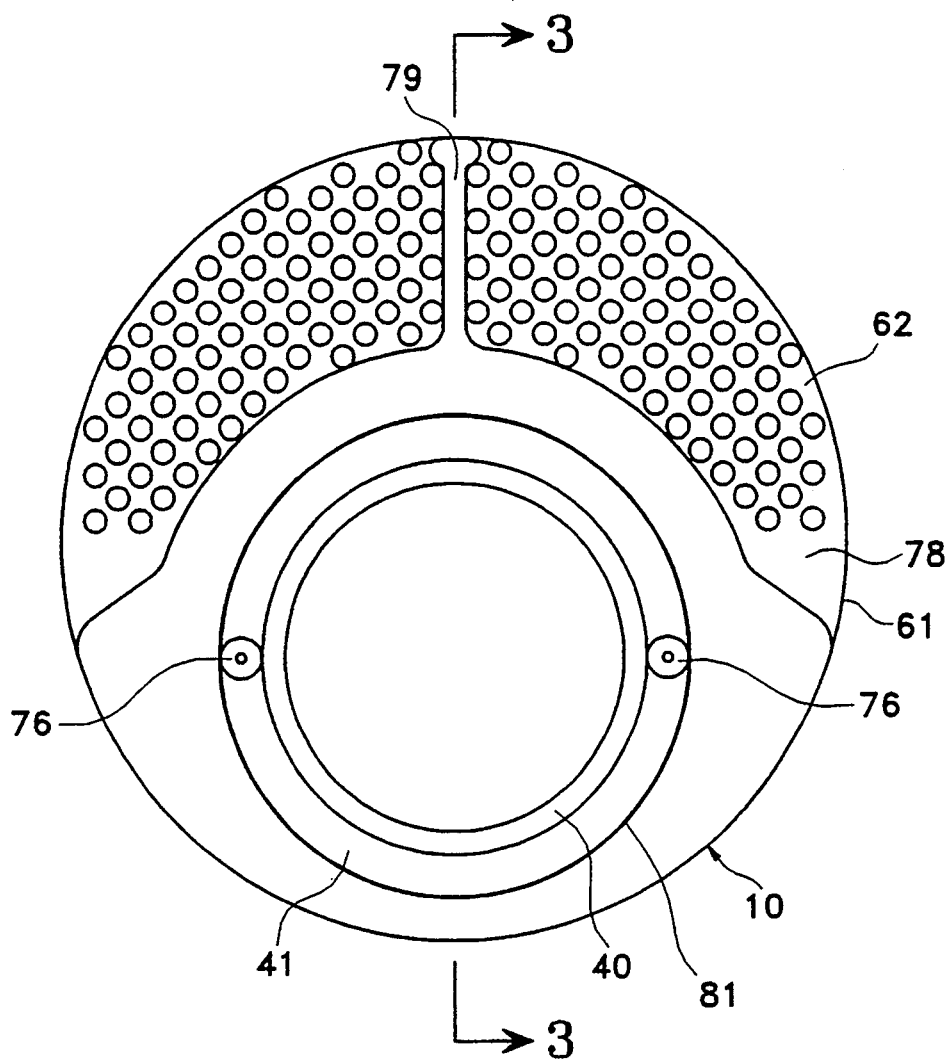
FIG. 6 is an enlarged rear view of the rear face of the suction fitting.

The rear face 61 has an exterior surface 78 and an interior surface 74, as shown in FIGS. 3 and 6. On the exterior surface 78 of the rear face 61 is an integrally formed radial protrusion 79, which serves to hold the protective covering away from the tub or spa wall and allow fluid to flow freely behind the covering. In the preferred embodiment of the invention, the exterior surface 78 also includes an annular boss 81 extending around a suction line connection 45 to the suction fitting 10. During installation a bead of calk is placed on this annular boss to seal the suction fitting against the tub or spa wall. Aligned coaxially with the suction fluid line 40, but located on the front face 63 of the protective covering 60, is an opening 80 and an associated nipple for connection to the pressure sensor line 50 behind the front face 63. A plurality of suction openings 70, formed as perforations in the entire front face 63 of the protective covering 60, allow the water to be drawn into the suction line 40. The protective covering 60 has a plurality of perforated recessed channels 90 radiating from the opening 80, to provide fluid communication between the opening 80 and those of the suction openings 70 that are located within the channels. When the front face of the suction fitting is partially or fully blocked, the channels 90 usually still provide fluid communication between the water in the pressure sensor line 50 and water immediately behind the front face, in the suction line connection 45. When flow into the suction fitting 10 is blocked, water tends to be pulled back from the pressure sensor line 50 and through the channels 90 to the suction line 45, to permit detection of the blockage by the level sensor, and thereby prevent cavitation of the pump. The water level sensor 30 will thus sense a reduced pressure at the suction fitting 10, immediately downstream of the blockage, and will deactivate the pump 20 to prevent the possibility of serious personal injury or death.

In the preferred embodiment and shown in FIG. 1, the suction fitting line 40 has a smaller diameter than the protective covering 60 and is eccentrically mounted on the suction fitting 10. Placement of the suction fluid line 40 practically at the circumference of the suction fitting 10 permits installation of the fitting close to the bottom of the tub or spa.

In the preferred embodiment of the invention, the suction line 45 includes a threaded portion, by means of which the suction fitting is mounted on the wall of the tub or spa, using a threaded nut (not shown).

It will be appreciated from the foregoing that the present invention represents a significant advance in the field of fluid circulation equipment. In particular, the invention provides a suction fitting that is more resistent to blockage than other fittings used for the same purpose. The provision of perforations in the rear of the fitting, and optionally in its edges, minimizes the risk of complete blockage. Moreover, the use of this suction fitting in conjunction with a device for sensing a blockage and controlling operation of the circulation pump, minimizes the possibility of serious personal injury or death, as well as damage to equipment and surrounding property. It will also be appreciated that, although a specific embodiment of the invention has been described in detail for purposes of illustration, various modifications may be made without departing from the spirit and scope of the invention. Accordingly, the invention is not to be limited except as by the appended claims.

We claim:

1. For use in conjunction with a fluid circulation pump in a tub or spa, a fluid suction fitting comprising:
   a hollow body, having a perforated front wall, a perforated rear wall generally parallel with the front wall, and a circumferential wall joining the front and rear walls, for installation below fluid level in the tub or spa;
   a suction tube in fluid communication with the body, for coupling the body, through a wall of the tub or spa, to a circulating pump line; and
   means for mounting the hollow body such that it is held away from the wall, to permit water to flow through perforations in the rear wall, whereby the chance of complete blockage of the fitting is minimized by the presence of perforations in the rear wall.

2. A fluid suction fitting as defined in claim 1, wherein:
   the hollow body is generally disk shaped; and
   the hollow body includes additional perforations in the circumferential wall, to further reduce the chance of complete blockage of the fitting.

3. For use in conjunction with a fluid circulation pump in a tub or spa, a fluid suction fitting comprising:
   a hollow body, having a perforated front wall, a perforated rear wall generally parallel with the front wall, and a circumferential wall joining the front and rear walls, for installation below fluid level in the tub or spa;
   a suction tube in fluid communication with the body, for coupling the body, through a wall of the tub or spa, to a circulating pump line; and
   means for mounting the hollow body such that it is held away from the wall, to permit water to flow through perforations in the rear wall, whereby the chance of complete blockage of the fitting is minimized by the presence of perforations in the rear wall;
   wherein a portion of the suction tube is integral with the rear wall of the hollow body; and
   wherein the means for mounting the hollow body includes a raised area integral with the rear wall of the hollow body, wherein the raised area is secured against the wall of the tub or spa, and at least a portion of the rear wall is thereby spaced from the wall.

4. A fluid suction fitting as defined in claim 3, wherein:
   the suction tube is offset from a central position toward one edge of the rear wall and connects with the rear wall close to its peripheral edge, to facilitate mounting of the suction fitting immediately adjacent to a bottom surface of the tub or spa.

5. For use in conjunction with a fluid circulation pump in a tub or spa, a combination comprising:
   a suction fitting for installation beneath fluid level in the tub or spa, to provide fluid communication between the tub or spa and the fluid circulation pump, the suction fitting defining a perforated body having a perforated front wall, a perforated rear wall generally parallel with the front wall, and a circumferential wall joining the front and rear walls, whereby the presence of perforations in both front and rear walls reduces the possibility of complete blockage of the suction fitting;
   a suction tube coupled to the perforated body, for connection to a fluid line to the pump;

means integral with the suction fitting for deactivating the pump in response to a condition in which fluid flow through the suction fitting to the pump is impeded; and means integral with the suction fitting, for mounting the perforated body held away from the wall, to permit water to flow through the perforated rear wall.

6. A combination as defined in claim 5, wherein:

the perforated body is generally disk-shaped; and at least a portion of the circumferential wall is also perforated to further reduce the possibility of complete blockage of the suction fitting.

7. For use in conjunction with a fluid circulation pump in a tub or spa, a combination comprising:

a suction fitting for installation beneath fluid level in the tub or spa, to provide fluid communication between the tub or spa and the fluid circulation pump, the suction fitting defining a perforated body having a perforated front wall and a perforated rear wall, whereby the presence of perforations in both walls reduces the possibility of complete blockage of the suction fitting;

a suction tube coupled to the perforated body, for connection to a fluid line to the pump;

means integral with the suction fitting for controlling operation of the pump in response to a condition in which fluid flow through the suction fitting to the pump is impeded;

means integral with the suction fitting, for mounting the perforated body held away from the wall, to permit water to flow through the perforated rear wall; and pressure sensing means integral with the suction fitting, for sensing fluid pressure in the tub or spa during normal operation and for sensing reduced pressure immediately downstream of a blockage in the suction fitting;

wherein the means for controlling operation of the pump in response to a condition in which fluid flow through the suction fitting is impeded, as detected by the pressure sensing means, includes means for shutting off the pump in the event of a detected blockage, whereby the possibility of damage or serious personal injury is minimized;

and wherein the pressure sensing means includes a sensor tube extending through the suction fitting and having an opening into the tub or spa; and fluid communication means extending from the opening of the sensor tube to a region immediately downstream of the suction fitting, whereby the pressure sensing means can detect a reduced pressure immediately downstream of the blockage.

8. A combination as defined in claim 7, wherein:

the fluid communication means includes a plurality of recessed channels on the front wall of the suction fitting, connecting the sensor tube opening to at least some of the perforations in the front wall, whereby, when the front wall is substantially blocked, the recessed channels provide a fluid path between the sensor tube and a region immediately downstream of the front wall.

9. A combination as defined in claim 5, wherein:

the suction tube includes a threaded portion integral with the rear wall of the suction fitting; and the integral means for supporting the hollow body held away from the tub or spa wall includes a raised area surrounding the threaded portion of the suction tube, whereby the threaded portion is secured through the wall of the tub or spa, with the raised portion engaging the wall to hold the rear wall of the perforated body of the suction fitting out from the wall.

10. For use in conjunction with a fluid circulation pump in a tub or spa, a combination comprising:

a suction fitting for installation beneath fluid level in the tub or spa, to provide fluid communication between the tub or spa and the fluid circulation pump, the suction fitting defining a hollow body having a perforated front wall and a perforated rear wall, whereby the presence of perforations in both walls reduces the possibility of complete blockage of the suction fitting;

a suction tube coupled to the hollow body, for connection to a fluid line to the pump;

means integral with the suction fitting for controlling operation of the pump in response to a condition in which fluid flow through the suction fitting to the pump is impeded; and means integral with the suction fitting, for mounting the hollow body held away from the wall, to permit water to flow through the perforated rear wall;

wherein the suction tube includes a threaded portion integral with the rear wall of the suction fitting;

and wherein the integral means for supporting the hollow body held away from the tub or spa wall includes a raised area surrounding the threaded portion of the suction tube, whereby the threaded portion is secured through the wall of the tub or spa, with the raised portion engaging the wall to hold the hollow body of the suction fitting out from the wall;

and wherein the suction tube is offset toward one edge of the hollow body, to facilitate installation of the suction fitting close to a bottom wall of the tub or spa.

* * * * *